3,162,653
4-HALO-2-BUTYNYL ETHERS
Joe W. Pullen, Overland Park, and Thomas R. Hopkins, Prairie Village, Kans., assignors, by mesne assignments, to Gulf Oil Corporation, Pittsburgh, Pa., a corporation of Pennsylvania
No Drawing. Filed Mar. 17, 1960, Ser. No. 15,535
7 Claims. (Cl. 260—347.8)

This invention relates to compositions and methods for controlling nematodes. More specifically, this invention relates to new 4-halo-2-butynyl ethers and methods of using them for controlling plant parasitic nematodes.

Nematodes are non-segmented worms, sometimes referred to as eelworms, which are found in all soils in which plants grow, and consequently every major crop is a potential victim of this pest. Some species such as the root-knot nematodes, Meloidogyne spp., citrus nematode, and sugar beet nematode, *Heterodera schachtii*, infest soils in which crops are planted and cause considerable damage to the crop. It has been estimated that the annual damage either directly or indirectly incurred from plant parasitic nematodes is as high as several million dollars. The term "nematode" as used herein is intended to include all forms through which nematodes pass in a life cycle, such as eggs, larvae and adults.

According to the present invention, there are provided new 4-halo-2-butynyl ethers and nematocidal compositions containing 4-halo-2-butynyl ethers. There are also provided methods for controlling nematodes by employing 4-halo-2-butynyl ethers. The 4-halo-2-butynyl ethers of this invention can be represented by the formula

wherein X is a halogen atoms, and preferably bromine or chlorine, and R represents an alkyl, cycloalkyl, aralkyl or heterocyclic radical. Where R is an alkyl radical, it is preferably a lower alkyl having 1 to about 8 carbon atoms, straight or branched chain. Examples of suitable alkyl radicals would include methyl, ethyl, propyl, isopropyl, butyl, isobutyl, pentyl, hexyl, and octyl. R may also represent a cycloalkyl group such as the cyclopentyl or cyclohexyl radicals; aralkyl group such as the benzyl or phenylethyl radical; or a heterocyclic group such as furfuryl or tetrahydrofurfuryl.

The 4-halo-2-butynyl ethers of this invention will effectively control nematodes by exposing them to a nematocidal amount of the compounds, such as by applying to soil infested with plant parasitic nematodes. When applied to soil at rate suitable for controlling nematodes, these compounds are not phytotoxic to growing plants. Since the compounds are relatively volatile at normal atmospheric temperature, they act as fumigants, and are rapidly distributed through the soil, permeating soil below and adjacent the side of application, thereby giving a rapid and widespread exposure of the chemical to the nematodes.

The 4-halo-2-butynyl ethers can be prepared by any one of several procedures. One such suitable procedure is the halogenation of the corresponding 4-hydroxy-2-butynyl ether with a nucleophilic halogenating agent such as thionyl chloride and phosphorus tribromide to give the corresponding 4-halo-2-butynyl ether. The reaction can be illustrated by the equation

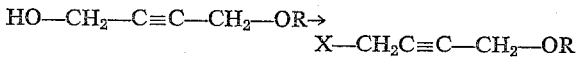

wherein X and R have the significance previously assigned.

The reaction is readily effected by bringing the reactants together, perferably in an inert reaction medium at room temperature or somewhat higher temperatures. At such temperatures the reaction goes to completion in a short time, one to three hours ordinarily being adequate. The solvent used is a matter of choice for those skilled in the art although benzene, diethyl ether, carbon tetrachloride and chloroform may be used satisfactorily with some of the reactants. A catalytic amount of pyridine may be included in the reaction to improve yields and increase the rate of halogenation. Recovery of the product from the reaction mixture can be effected by conventional methods.

The 4-iodo-2-butynyl ethers may be conveniently prepared from the corresponding 4-chloro-2-butynyl ether and sodium iodide by the conventional metathesis procedures.

Alternate processes may be employed to prepare the compounds of this invention, some of which are illustrated herein by the examples.

The 4-hydroxy-2-butynyl ethers useful as intermediates in the preparation of the 4-halo-2-butynyl ethers can be prepared by the reaction of 4-chloro-2-butyn-1-ol with an alkali metal salt of the appropriate alcohol.

The following examples illustrate the preparation of representative 4-halo-2-butynyl ethers of this invention, but are not to be considered to limit the invention.

EXAMPLE 1

*4-Chloro-2-Butynyl Methyl Ether*

To a stirred mixture of 31.4 grams (0.3 mole) of 4-chloro-2-butyn-1-ol and 200 ml. of water was added from a dropping funnel and aqueous solution containing 12 grams (0.3 mole) of sodium hydroxide, while simultaneously, 37.8 grams (0.3 mole) of dimethyl sulfate was added from another dropping funnel. The addition was made at a temperature of 0 to 10° C. over a period of 30 minutes. The mixture was then refluxed for 3 hours. The lower, amber colored organic layer was separated and the water layer was extracted with two 50 ml. portions of diethyl ether. The ether extracts were combined with the separated organic layer and dried over calcium sulfate. The ether was removed by distillation under reduced pressure (water aspirator) to give 17.9 grams of a residual oil. The oil was distilled under reduced pressure and the fraction boiling at 60–62° C./15 mm. was collected as 4-chloro-2-butynyl methyl ether (10.7 grams); $N_D^{20}$ 1.4670.

EXAMPLE 2

*4-Bromo-2-Butynyl Methyl Ether*

To a solution of 10.1 grams of 4-hydroxy-2-butynyl methyl ether, 2 drops of pyridine and 100 ml. of chloroform was added, dropwise with stirring, 13.5 grams of phosphorus tribromide at 0–2° C. After the addition was completed, the mixture was allowed to warm to 10° C. in a one-hour period and then poured onto 100 ml. of cracked ice. The chloroform layer was separated, washed with a sodium bicarbonate solution, and dried over anhydrous sodium sulfate. After removal of the solvent by distillation under reduced pressure there was obtained 7.0 grams of pale amber liquid, $N_D^{20}$ 1.4902.

EXAMPLE 3

*4-Iodo-2-Butynyl Methyl Ether*

To 300 ml. of ethanol saturated with sodium iodide was added 11.9 grams of 4-chloro-2-butynyl methyl ether. The solution turned a bright yellow color immediately, and after 10 minutes became very turbid. The mixture was stirred at about room temperature for 16 hours and then filtered to remove the crystalline, insoluble salt. Ten grams of sodium iodide were added to the filtrate and the mixture stirred an additional 2 hours. The solution was then concentrated by evaporation under an air stream to about 100 ml. The insoluble salt was removed by filtration and the filtrate diluted with 200 ml. of water.

The water layer was decanted from the lower, dark orange oil which was extracted with four 100 ml. portions of diethyl ether. The combined ether extracts were dried over sodium sulfate and the ether removed by distillation under reduced pressure (water aspirator). The residue was kept under reduced pressure for 2 hours and filtered again. The resultant oil was kept in a vacuum desiccator over calcium chloride for 1.5 hours at reduced pressure (8 mm.) to give the product as an orange oil; $N_D^{20}$ 1.5740.

EXAMPLE 4

*4-Chloro-2-Butynyl Cyclohexyl Ether*

4-hydroxy-2-butynyl cyclohexyl ether was prepared by reacting one mole of 4-chloro-2-butyn-1-ol with sodium cyclohexylate in 1200 ml. of diethyl ether. After removing the by-product sodium chloride, the ether solution was washed with 1% aqueous sulfuric acid until it was neutral, and dried over sodium sulfate. The ether solution of 4-hydroxy-2-butynyl cyclohexyl ether was chlorinated with thionyl chloride in the presence of 5 drops of pyridine. The thionyl chloride (1 mole) was added dropwise at about 30–34° C. over a period of about 70 minutes. The mixture was stirred at about room temperature for 1.5 hours and then poured over cracked ice. The aqueous solution was neutralized with sodium bicarbonate, the ether layer separated and dried over sodium sulfate. The ether was removed by distillation under reduced pressure to give 4-chloro-2-butynyl cyclohexyl ether as a dark oil which would not distill at 70° C. under 0.2 mm. pressure; $N_D^{20}$ 1.5261.

EXAMPLE 5

*4-Chloro-2-Butynyl Benzyl Ether*

Thionyl chloride (59.5 grams) was added dropwise to a stirred solution of 83 grams of 4-hydroxy-2-butynyl benzyl ether, 43.5 grams of pyridine and 200 ml. of diethyl ether at about 5–35° C. The thionyl chloride addition required 2 hours. The mixture was stirred for 2 hours at room temperature and then heated at 34° C. for 1 hour. After standing overnight, the upper layer was decanted from a black tar. The tar was extracted once with diethyl ether and the ether extract combined with the previously separated upper ether layer and dried over anhydrous sodium sulfate. The ether was removed by distillation under reduced pressure to give a dark brown oil as a residue. Volatiles were removed by heating the oil up to 80° C. at 0.3 mm. pressure to give 4-chloro-2-butynyl benzyl ether as a dark oil; $N_D^{20}$ 1.5410.

EXAMPLE 6

*4-Chloro-2-Butynyl Furfuryl Ether*

To a stirred solution of 123 grams of 1,4-dichloro-2-butyne and 300 ml. of dioxane was added a slurry of 0.25 mole of sodium furfurylate in 350 ml. of dioxane at about 26–29° C. The dioxane-sodium furfurylate slurry was added in 20 ml. portions over a period of 5 hours. After standing for several days, the pH of the mixture dropped from 9 to neutral. The mixture was filtered to remove the insoluble salt and the filtrate distilled under reduced pressure to remove the solvent and give a residual black oil, which was collected as 4-chloro-2-butynyl furfuryl ether.

EXAMPLE 7

*4-Chloro-2-Butynyl Ethyl Ether*

To 400 ml. of absolute ethanol containing freshly prepared sodium ethoxide (0.9 mole) was added 0.9 mole of 4-chloro-2-butyn-1-ol. The temperature rose slowly to 75° C. during the addition. The resulting solution was refluxed for 4 hours and then cooled to room temperature and filtered. The filtrate was distilled under reduced pressure to remove the ethanol and the residue dissolved in benzene. Pyridine (5 drops) was added to the benzene solution and then 0.9 mole of thionyl chloride added dropwise at 50° C. The resultant solution was maintained at 50° C. for 2 hours, then cooled and poured over cracked ice. The benzene layer was separated, dried over calcium chloride and distilled under reduced pressure. 4-chloro-2-butynyl ethyl ether was collected at 51–52° C./2 mm.; $N_D^{27}$ 1.4530.

EXAMPLE 8

*4-Chloro-2-Butynyl n-Butyl Ether*

4-butoxy-2-butyn-1-ol was prepared from sodium butoxide and 4-chloro-2-butyn-1-ol and then chlorinated with thionyl chloride in benzene as described in Example 7. Distillation under reduced pressure gave 4-chloro-2-butynyl n-butyl ether as a fraction boiling at 70–72° C./2 mm.; $N_D^{25}$ 1.4610.

The optimum rate of application for the control of plant parasitic nematodes will depend on the type of crop as well as such features as pH of the soil, soil conditions, climatic conditions and the particular type of nematode being treated. It has been found, however, that excellent control of the root knot nematode, without danger of phytotoxicity, is exhibited at a dosage of about 10–100 lbs. per acre. Lower rates are effective if the agent is thoroughly mixed with the soil.

The application of the 4-halo-2-butynyl ethers to soil is readily achieved by the use of novel concentrates and compositions containing these compounds as the active ingredients. To achieve a suitable dispersion in soil it may be convenient to employ compositions in which the active compound is combined with an inert carrier or diluent. The carrier may be a solvent which is miscible with the active agent, or it may be a solvent which is not miscible with the compound where suitable dispersions are also effective. Such compositions may be sprayed on the soil, or injected into the soil.

The active compound may also be absorbed on solid carriers, particularly powders of either organic or mineral composition. Examples of such solid carriers are pumice, expanded mica, kaolin, clay and pulverized limestone. Dusting is a convenient way to apply such compositions.

Water may be preferred as the carrier because it is widely available and inexpensive. Since the compounds are essentially immiscible with water, however, there should be included in the composition a surface active agent which will provide a homogeneous mixture from which the nematocidal compound will not settle out rapidly. The surface active agent may be ionic or non-ionic, and may be a liquid or a solid. The use of the term "surface active agent" herein is intended to include such compounds commonly referred to as wetting agents, dispersing agents and emulsifying agents. Typical satisfactory surface active agents which may be used are alkali metalhigher alkylarylsulfonates such as sodium dodecylbenzene sulfonate, fatty alcohol sulfates such as the sodium salts of the monoesters of sulfuric acid with n-aliphatic alcohols containing 8–18 carbon atoms, sodium salts of alkylnaphthalenesulfonic acids, long chain quaternary ammonium compounds, sodium salts of petroleum-derived alkylsulfonic acids, polyethylene sorbitan monooleate, alkylaryl polyether alcohols, water-soluble lignin sulfonate salts, alkali-casein compositions, long chain alcohols usually containing 10 to 18 carbon atoms, condensation products of ethylene oxide with fatty acids, abietic acid, alkyl phenols and mercaptans. These dispersing and wetting agents are sold under numerous trade names and may either be pure compounds, mixtures of compounds of the same general groups, or they may be mixtures of compounds of different classes. Surface active agents can also be used in compositions containing a solid inert carrier.

An adjuvant liquid may also be included in such compositions. Such liquids may be either soluble or insoluble in water, and may be any solvent such as an alcohol, benzene, toluene, kerosene or hexane, which aids in solubilizing or dispersing the active nematocidal agent in water.

Concentrated compositions containing the active nematocidal agent which may be subsequently diluted, as with water, to the desired concentration for application to soils are also provided. The advantages of such concentrates are that they are prepared by the manufacturer in a form such that the user need only mix them with a locally available carrier, preferably water, thereby keeping shipping costs to a minimum while providing a product which may be used with a minimum of equipment and effort. Such concentrates may contain about 50% or more of the active nematocidal agent with a carrier or diluent, which may be a solid or liquid. Liquid carriers which are miscible with the active agent or other liquids in which the compound may be suspended may be used. A wetting or surface active agent is also generally included to facilitate such dilution or dispersion in water. However, the wetting agent or surface active agent itself may comprise the carrier in such concentrates.

As hereinbefore stated, the nematocidal compositions of this invention may be applied to soil by injection below the surface of soil, thereby acting as soil fumigants, moving to adjacent areas and killing harmful plant parasitic nematodes. When employed as a fumigant, the 4-halo-2-butynyl ethers may be applied as the undiluted compound or may be diluted with an inert carrier. Kerosene is a preferred carrier for application by soil injection. The nematocidal 4-halo-2-butynyl ethers are readily miscible with kerosene, providing an excellent fumigant composition.

The nematocidal compositions may also be used as a root dip, whereby the roots of nematode-infested plants are dipped briefly in compositions comprising the 4-halo-2-butynyl ether and a liquid inert carrier or diluent.

The following examples illustrate the nematocidal activity of representative compositions of this invention.

EXAMPLE 9

Water suspensions of the test chemicals were prepared in the concentration series of 500, 50 and 5 parts per million. Each concentration was placed in a stoppered test tube. Young adult Panagrellus nematodes were added to each test tube and the contents observed after 24 hours and again after 7 days. The number of live nematodes was observed and the lowest concentration of chemical giving 99+% kill was recorded. The results are recorded in Table I.

TABLE I

| Compound | Lowest Effective Concentration (p.p.m.) | |
|---|---|---|
| | at 24 hrs. | at 7 days |
| 4-chloro-2-butynyl methyl ether | 500 | 50 |
| 4-bromo-2-butynyl methyl ether | 50 | 5 |
| 4-iodo-2-butynyl methyl ether | 50 | 5 |
| 4-chloro-2-butylnyl ethyl ether | 500 | 50 |
| 4-chloro-2-butynyl n-butyl ether | 500 | 50 |
| 4-chloro-2-butynyl benzyl ether | 50 | 50 |
| 4-chloro-2-butynyl cyclohexyl ether | N.S. | 500 |
| 4-chloro-2-buytnyl furfuryl ether | 50 | 50 |
| Control (no chemical) | N.S. | N.S. |

N.S.=No significant control.

EXAMPLE 10

The following experiment was made to determine the effectiveness of 4-chloro-2-butynyl methyl ether as a dust composition for controlling nematodes in the presence of soil. The chemical was mixed with kaolin, slurried with acetone, and the acetone then evaporated to leave a chemical dust. The dust was mixed with root-knot nematode-infested soil and held in sealed jars (three replicates) for seven days at 86° F. The soil was then potted and planted to squash seven days later. The plant roots were examined for galling two months after planting. The percent control was determined by the amount of galling, i.e., no galls—100% control. The results are presented in Table II.

TABLE II

| Compound | Percent Control ᵃ at— | | |
|---|---|---|---|
| | 100#/A. | 31#/A. | 10#/A. |
| 4-chloro-2-butynyl methyl ether | 100 | 100 | 80 |

ᵃ Average of three replicates.

EXAMPLE 11

The following experiment was conducted to evaluate the 4-halo-2-butynyl ethers as soil fumigants for nematodes.

One-gallon glazed crocks were half-filled with root-knot nematode (Meloidogyne spp.) infested soil. A kerosene solution (2.5 ml.) of each chemical was then pipetted onto the soil surface at the center of the crock. Concentration of the test chemical in kerosene was varied to give application rates of 100, 31 and 10 pounds per acre (by volume). Two replicates were used with each concentration. The crocks were then immediately filled with nematode infested soil. After filling, the soil was pressed gently with a flat surface to provide a vapor seal. The crocks were held at a constant temperature (80+1° F.) for three weeks and then transferred to a greenhouse and planted to tomato seedlings.

Eight weeks after planting, the roots were examined for nematode control. Nematode control was determined from the amount of galling. The results are recorded in Table III.

TABLE III

| Compound | Percent Control ᵃ of Nematodes @ Rates of (lb./A.) | | |
|---|---|---|---|
| | 100 | 31 | 10 |
| 4-chloro-2-butynyl methyl ether | 100 | 100 | 99 |
| 4-chloro-2-butynyl n-butyl ether | 99 | 75 | N.S. |
| 4-chloro-2-butynyl ethyl ether | 100 | 100 | 97 |
| Kerosene Control | N.S. | N.S. | N.S. |

N.S.—No significant control.
ᵃ Mean of two replicates.

Various changes and modifications of the invention can be made and, to the extent that such variations incorporate the spirit of this invention, they are intended to be included within the scope of the appended claims.

What is claimed is:
1. A compound of the formula

$$X-CH_2-C \equiv C-CH_2-O-R$$

wherein X is halogen selected from the group consisting of chlorine, bromine and iodine and R is a member of the group consisting of lower alkyl, cyclohexyl, phenyl lower alkyl, furfuryl and tetrahydrofurfuryl.
2. 4-chloro-2-butynyl methyl ether.
3. 4-bromo-2-butynyl methyl ether.
4. 4-chloro-2-butynyl cyclohexyl ether.
5. 4-chloro-2-butynyl ethyl ether.
6. 4-chloro-2-butynyl furfuryl ether.
7. 4-chloro-2-butynyl benzyl ether.

References Cited in the file of this patent

UNITED STATES PATENTS

| 2,834,707 | Smith | May 13, 1958 |
| 2,853,528 | Wojcik | Sept. 23, 1958 |
| 2,889,244 | Youngson | June 2, 1959 |
| 2,889,245 | Bonrath | June 2, 1959 |
| 2,913,500 | Becke | Nov. 17, 1959 |

OTHER REFERENCES

Henne et al.: J. Amer. Chem. Soc., vol. 58 (1936), page 882.

(Other references on following page)

OTHER REFERENCES

Zeile et al.: Chem. Berichte, vol. 82 (1949), page 273.
Simons: Fluorine Chemistry (1950), at page 402.
Wagner et al.: Synthetic Organic Chemistry (1953), page 94.
Petrov et al.: Chem. Abstracts, vol. 49 (1955), col. 12, 285d.
Petrov: Chem. Abstracts, vol. 51 (1957), col. 9471 (1956).
Bertrand: Compte Rend., vol. 244 (1957), pp. 619–620.
Hatch et al.: J. Organic Chemistry, vol. 23 (1958), pp. 397–401.
Fieser: Organic Chemistry (1956), pp. 88–93.
Henne et al.: J. Amer. Chem. Soc., vol. 58 (1936), page 882.